April 16, 1940.　　　　W. R. ELSEY　　　　2,197,720
SPRING RIGGING FOR BOLSTER TYPE TRUCKS
Filed Aug. 1, 1938　　　2 Sheets-Sheet 1
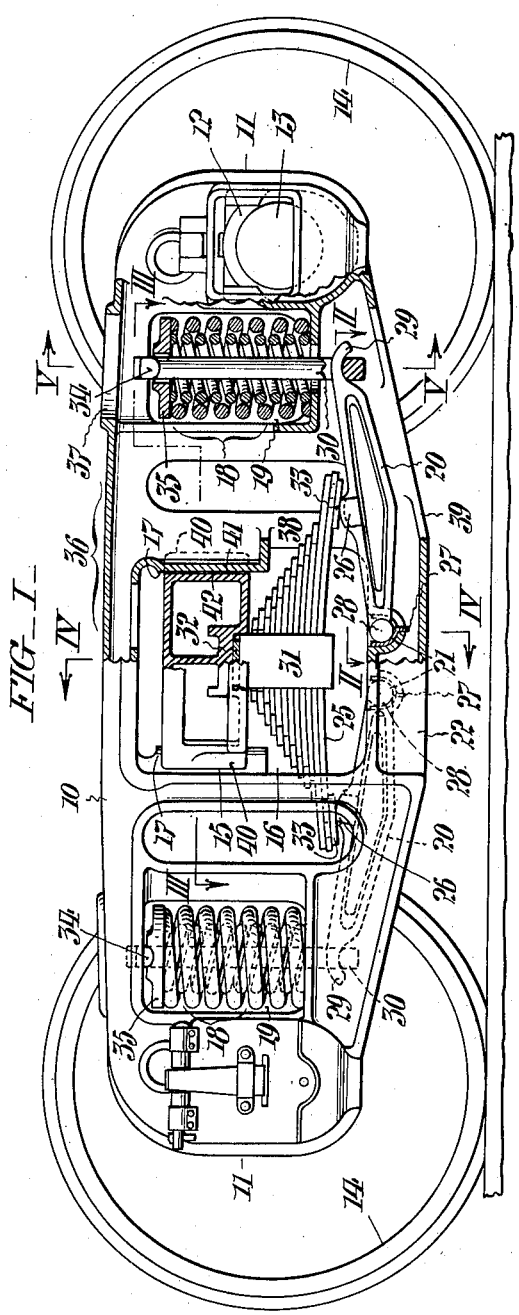
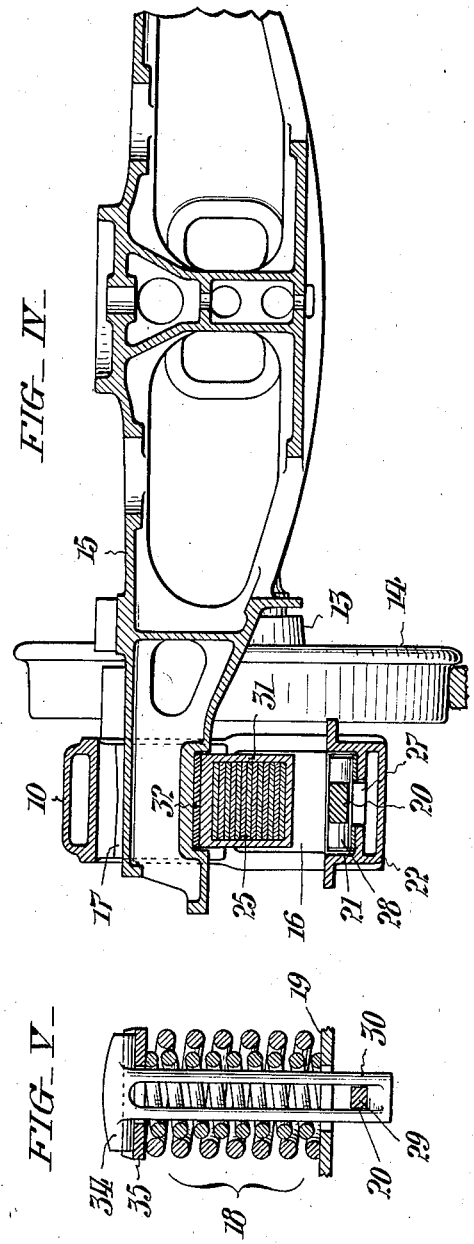
WITNESSES:
Hubert Fuchs
William Bell, Jr.
INVENTOR:
Warren R. Elsey,
BY Paul & Paul
ATTORNEYS.

April 16, 1940.   W. R. ELSEY   2,197,720
SPRING RIGGING FOR BOLSTER TYPE TRUCKS
Filed Aug. 1, 1938   2 Sheets-Sheet 2
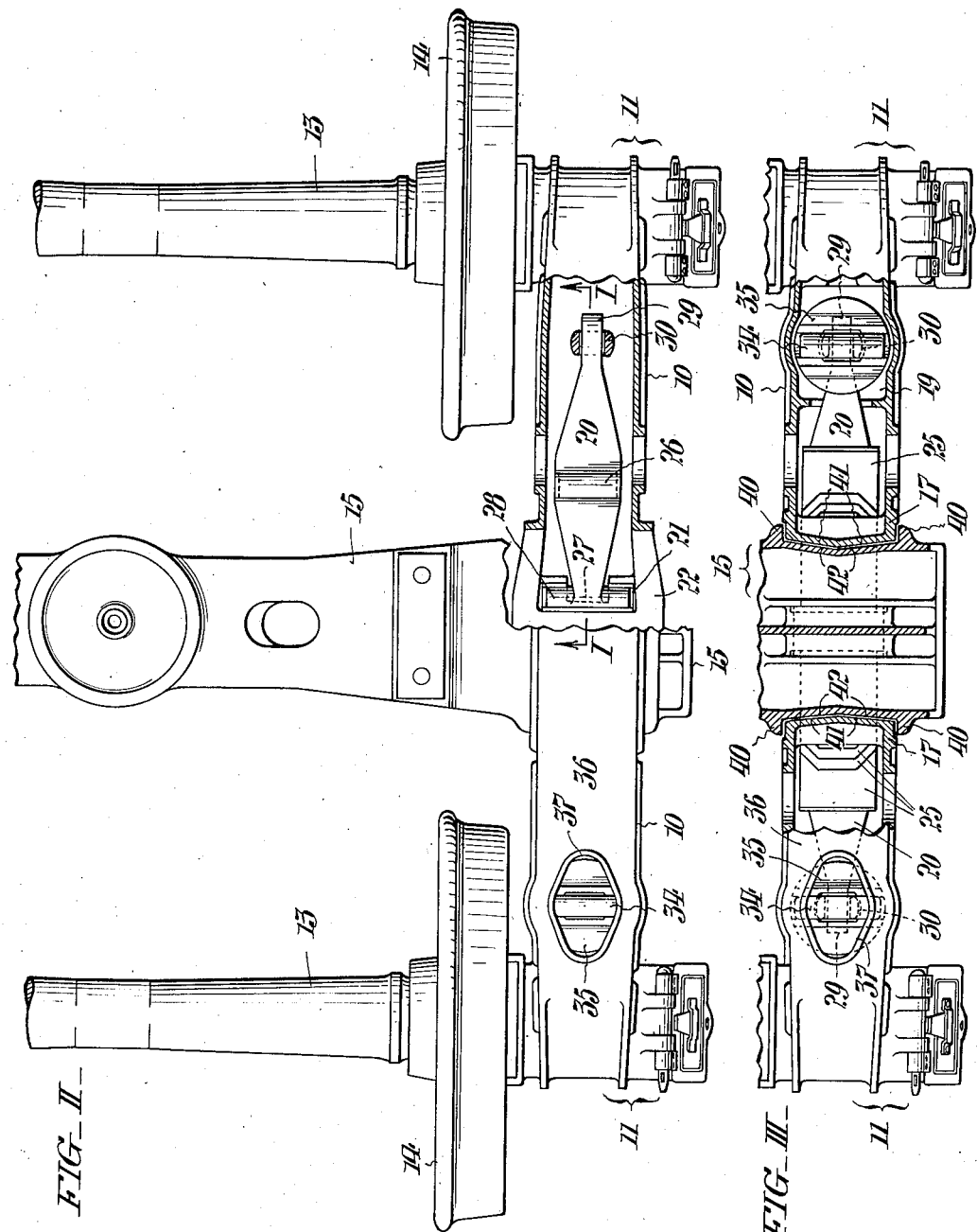
WITNESSES:
Hubert Fuchs
William Bell, Jr.
INVENTOR:
Warren R. Elsey,
BY Paul & Paul
ATTORNEYS.

Patented Apr. 16, 1940

2,197,720

UNITED STATES PATENT OFFICE 2,197,720

SPRING RIGGING FOR BOLSTER TYPE TRUCKS

Warren R. Elsey, Merion, Pa., assignor to The Pennsylvania Railroad Company, Philadelphia, Pa., a corporation of Pennsylvania Application August 1, 1938, Serial No. 222,365

11 Claims. (Cl. 105—197.1)

This invention relates to railway trucks and the like, and especially to spring rigging for bolster type trucks. An important aim of the invention is to allow of regulatng or minimizing the up and down movement of the bolster (and of the car body supported thereby) in comparison with the corresponding spring deflection, so that very resilient springs can be used, and the car rendered very easy-riding. I also aim to permit fore and aft tipping of the truck as a whole without tipping the bolster, and to absorb vibration or shocks due to irregularities of track in the spring system, without transmitting them to the car body. Preferably, I use springs of different types acting in series, and provide for a snubbing or damping action in the spring rigging, so as to minimize vibration of the car due to irregularities of the track. I also aim to facilitate installation, inspection, and removal of the springs. To a large extent, these objects of my invention may be realized independently of one another.

Other features and advantages of the invention will appear from the following description of a species or form of embodiment, and from the drawings. All the features and combinations shown or described are, indeed, of my invention, so far as novel over the prior art.

In the drawings,

Fig. I is a side view of a railway truck embodying my invention, the right hand portion of the truck being for the most part shown in vertical mid-section as indicated by the line and arrows I—I in Fig. II, and the right hand journal box lid being omitted.

Fig. II is a plan view of one side of a truck such as illustrated in Fig. I, with a portion of the truck frame and associated parts in horizontal section as indicated by the line and arrows II—II in Fig. I.

Fig. III is a plan view of one side of the truck frame, with parts in horizontal section as indicated by the line and arrows III—III in Fig. I.

Fig. IV shows a vertical section through the truck bolster and side frame, taken as indicated by the line and arrows IV—IV in Fig. I.

Fig. V shows a vertical section through one set of the helical springs indicated in Fig. I, taken as indicated by the line and arrows V—V in Fig. I.

The side frame 10 of the truck here illustrated has at either end suitable journal boxes or means 11 for holding the bearings 12 for the axles 13 of the truck wheels 14. There is also a transverse bolster 15 whose end extends into a window opening 16 in the side frame 10 and engages with guideways 17 at opposite sides of this opening, for up and down movement relative to the side frame. The bolster end is sustained in the window opening 16 by spring means 18 (shown of helical type) mounted and seated at 19 in suitable openings in the frame 10 adjacent the journal box 11, between the same and the window 16. The spring means 18 acts through spring rigging which includes levers 20, fulcrumed at 21 on the lower tension member 22 of the truck frame 10, below the window 16 and preferably close to mid-length of the frame 10, and also a transmission or equalizing lever member or lever 25 which is preferably a leaf spring, and is here shown as of laminated construction, and of an elliptic type, viz., a semi-elliptic spring, and bearing on the levers 20 at points 26 preferably intermediate the fulcrum 21 and the connection to the spring means 18. As the two levers 20, 20 shown are just alike, only one need be described.

As shown in Figs. I, II, and IV, the fulcrum bearing 21 for each lever 20 comprises a U-shaped bearing block set into a recess in the lower frame member 22 (which forms the bottom of the window opening) and held in place by a key projection 27, and having one side cut away (Fig. II) to accommodate the lever, which has a transverse pivot head 28 engaged in the bearing block. The other or outer end 29 of the lever 20, of curved hook-like form, is pivotally engaged in the lower end of a longitudinally slotted connecting hanger link 30 associated with the helical spring means 18. As shown in Figs. I and IV, the member 25 has at its middle a projection (formed by the strap 31 that holds its spring leaves together) which is engaged, loose, in a recess in the bottom of the bolster 15, a shim 32 being shown interposed. On its ends, the lever 25 may have wear plates 33 that bear on the rounded bearing blocks 26 near the mid-points of the levers 20,—in the present instance, closer to their fulcra at 21, and at a substantially higher level than the fulcra. As shown in Figs. I, III, and V, the hanger link 30 extends up through the seat 19 and the center of the helical spring means 18, and has on its upper end a transverse pivot 34 whose projecting ends rest in curved seats on a spring cap 35, itself seated on the upper end of the helical spring means 18. In the present instance, the spring means 18 comprises oppositely wound concentric helical springs, of different scale, and made of wire of different sizes. As shown in Figs. I, II, and III, the upper compression member 36 of the truck frame has openings 37 therein over the helical spring means 18, to facilitate inspection and lubrication of the spring caps 35, as well as for insertion of the links 30. As will be seen from Fig. I, the springs 18 are readily visible and accessible from both sides of the side frame 10, and are easily installed or removed as indicated above.

As shown in Figs. I, II, III and IV, the truck side frame 10 is hollow, and so likewise is its lower tension member 22, whose mid-portion is of a U-section, so as to house the levers 20, 20. Below the guideways 17, 17, the sides of the bolster window 16 have openings 38 through which extend the ends of the lever member 25; and the lower sides of the bottom tension member 22 also have openings 39 therethrough. This makes it easy to assemble the parts by first inserting the member 25 through the openings 39, 38 into its position as shown in Fig. I, and then inserting the levers 20, 20 in a more or less similar manner. This, of course, is done after the end of the bolster 15 has been inserted in the window 16 below the guides 17, and raised into engagement with them. The levers 20 are easily engaged with the links 30 and with their fulcrum seats 21 before the parts 25 and 15 are lowered to rest on them as in Fig. I.

As shown in Figs. I, II, and III, the end of the bolster 15 extends through the bolster window 16 and has vertical stop flanges 40, 40 at opposite sides of the guides 17, 17, which engage and coact with the outer and inner edges of the guides to determine the longitudinal position of the bolster 15 in the window 16, and to keep the side frame 10 truly upright. In other words, the flanges 40, 40 form guide grooves or guideways on the bolster 15, for the side frame guides 17, 17. The fore and aft position of the side frame 10 relative to the bolster 15 is determined by engagement of the faces of the guides 17, 17 with the bolster surfaces at the bottoms of the bolster guide-grooves formed by the flanges 40, 40. As shown in Fig. III, the faces of the guides 17, 17 are not flat, but formed by surfaces 41, 41 intersecting in the central longitudinal plane of the side frame 10 at a very obtuse angle to one another; and the coacting surfaces of the bolster 15 (at the bottoms of its guide grooves) are of like conformation, being formed by surfaces 42, 42 paralleling the corresponding surfaces 41, 41, with slight clearance. In service, corresponding surfaces 41, 42 at each side of the bolster coact with those diagonally opposite, rather than with those directly adjacent.

It will be seen from Fig. I that by suitably proportioning the levers 20 and the member 25, and by suitably locating the springs 18 lengthwise of the frame 10 and the bearings 26 lengthwise of the levers 20, the vertical movement of the bolster 15 and of the car body (not shown) carried thereby can be regulated or proportioned practically in any way desired in relation to the corresponding deflection of the springs 18. In this connection, it may be remarked that the springs 18 need not necessarily be between the axle-bearing holding means 11 of the truck. As shown in Fig. I, the parts are so located and proportioned that the vertical bolster movements are substantially less than the total corresponding aggregate deflections of the springs 18 and, indeed, of the springs 18 and 25 together. Also, the vertical positions of the bearing blocks 26 can be varied relative to the fulcra 21 to vary their fore and aft motion in relation to their corresponding up and down motions, so as to give either an unresisted rocking of the levers 20, or a frictional snubbing by the movement of the blocks 26 to and fro along the bearing plates 33. Moreover, the engagement of the member 25 with the end of the bolster 15 at 32 allows it to rock fore and aft relative to the truck, and thus allows the whole truck to tip fore and aft, slightly, relative to the bolster 15,—without tipping the bolster,—so that vibration or shock due to track irregularities or other causes can be absorbed in the spring system without reaching the car body.

It will be understood, of course, that the truck will include another side frame at the other end of the bolster 15 (omitted for simplicity of illustration), which may be like that illustrated, and equipped with the same spring rigging. While the truck as shown operates successfully without any spring plank, tie-bar, or other means besides the bolster 15 for interconnecting its side frames, yet it is equally operative with such additional interconnection of the side frames. It will also be apparent that the spring rigging will operate with one of the levers 20 jammed or otherwise rendered immovable, or even if one of them were replaced with a fixed bearing support for the corresponding end of the member 25,—though in this case some modification of spring scale and of proportions of the parts might be advantageous. In this connection, it may be remarked that the two ends of the member 25 are independently supported, so that motion of one end is independent of any motion of the other end. Furthermore, while a member 25 that is a bow or leaf spring, and preferably of multileaf construction, generally gives easier riding, yet the spring rigging will also operate with a member 25 so stiff as to be practically rigid,—in which case it acts simply as a lever to transmit motion from and to the levers 20, or/and as an equalizer lever to distribute load and/or motion between the springs 18, 18 at opposite sides of the bolster 15.

Having thus described my invention, I claim:

1. In a truck of the character described, the combination with a side frame having means to hold axle-bearings, a bolster window opening, and spring openings between the window opening and said axle-bearing holding means, a bolster whose end is movable up and down in said window opening, and an equalizing lever extending lengthwise of the side frame under the bolster, and supporting the bolster at an intermediate point of its own length, of spring means mounted on the side frame in said spring openings, and other levers sustained by said spring means at their remote ends and fulcrumed on the bottom of said window opening at their adjacent ends, each of said latter levers sustaining an end of said equalizing lever between its own fulcrum and its connection to said spring means.

2. In a truck of the character described, the combination with a side frame having means to hold axle-bearings and a bolster window opening, a bolster whose end is movable up and down in said window opening, and an equalizing lever extending lengthwise of the side frame and supporting the bolster at an intermediate point of its own length, spring means mounted on the side frame to either side of the window opening, and other levers extending lengthwise of the side frame sustained by said spring means at their remote ends and fulcrumed on the side frame at their adjacent ends, each of said latter levers sustaining an end of said equalizing lever closer to its own fulcrum than to its connection to its said sustaining spring means, and thus transmitting the deflection of said spring means through said equalizing lever to the bolster in a reduced proportion.

3. In a truck of the character described, the combination with a side frame having means to hold axle-bearings, a bolster window opening, and spring openings between the window opening and said axle-bearing holding means, a bolster whose end is movable up and down in said window opening. and an equalizing lever extending lengthwise of the side frame under the bolster, and supporting the bolster at an intermediate point of its own length, of helical spring means mounted on the side frame in said spring openings and freely accessible from the outer side of the truck, and other levers sustained by said helical spring means at their remote ends and fulcrumed on the side frame at their adjacent ends, substantially at mid-length of the side frame, each of said latter levers sustaining an end of said equalizing lever between its own fulcrum and its connection to said helical spring means.

4. In a truck of the character described, the combination with a side frame having means to hold axle-bearings and a bolster window opening, a bolster whose end is movable up and down in said window opening, and spring means mounted on the side frame at one side of said window opening, of a lever extending lengthwise of the side frame fulcrumed thereon and sustained by said spring means at its outer end, and a leaf spring also extending lengthwise of the side frame supported at one end by said lever and at its other end supported independently thereof, and intermediately supporting the said bolster end.

5. In a truck of the character described, the combination with a side frame having means to hold axle-bearings and a bolster window opening, a bolster whose end is movable up and down in said window opening, and spring means mounted on the side frame at one side of said window opening, of a lever extending lengthwise of the side frame fulcrumed on the bottom of said window opening and sustained by said spring means at its outer end, and a leaf spring also extending lengthwise of the side frame supported at one end by said lever at a point substantially above the fulcrum of said lever and at its other end supported independently of the lever, and intermediately supporting the said bolster end.

6. In a truck of the character described, the combination with a side frame having means to hold axle-bearings and a bolster window opening, a bolster whose end is movable up and down in said window opening, and helical spring means mounted on the side frame at one side of said window opening, of a lever extending lengthwise of the side frame fulcrumed thereon and sustained by said spring means at its outer end, and a leaf spring also extending lengthwise of the side frame supported at one end by said lever and at its other end supported independently thereof, and intermediately supporting the said bolster end.

7. In a truck of the character described, the combination with a side frame having means to hold axle-bearings and a bolster window opening, a bolster whose end is movable up and down in said window opening, and helical spring means mounted on the side frame at one side of said window opening, of a lever extending lengthwise of the side frame fulcrumed thereon at one end and sustained by said spring means at its other end, and a leaf spring also extending lengthwise of the side frame supported at one end by said lever at a point substantially above the fulcrum of said lever and at its other end supported independently of the lever, and intermediately supporting the said bolster end.

8. In a truck of the character described, the combination with a side frame having means to hold axle-bearings, a bolster window opening, a bolster whose end is movable up and down in said window opening, a transmission member extending lengthwise of the side frame supported at its own ends and supporting the bolster at an intermediate point of its own length, of spring means mounted on the side frame between the window opening and said axle-bearing holding means, and a lever sustained by said spring means at one end and fulcrumed on the side frame at its other end, substantially at mid-length of the side frame, and sustaining an end of said transmission member between its fulcrum and its connection to said spring means.

9. In a truck of the character described, the combination with a side frame having means to hold axle-bearings, a bolster window opening, and openings through its bottom tension member and the side of said window opening, and a bolster whose end is movable up and down in said window opening, of a transmission lever in the side frame extending lengthwise thereof, supported at its own ends and supporting the bolster at an intermediate point of its own length, and insertable in place under the bolster through said openings in said bottom tension member and said window opening side, spring means mounted on the side frame, and another lever, sustained by said spring means at one end and fulcrumed on the side frame at its other end under the window opening, sustaining an end of said transmission lever between its fulcrum and its connection to said spring means, and also insertable in place through said openings in said bottom tension member and the side of said window opening.

10. In a truck of the character described, the combination with a side frame having means to hold axle-bearings, a bolster window opening, and spring openings between the window opening and said axle-bearing holding means, and a bolster whose end is movable up and down in said window opening, of a leaf spring extending lengthwise of the side frame under the bolster and supporting the bolster at an intermediate point of its own length, helical spring means mounted on the side frame in said spring openings, and levers extending lengthwise of the side frame fulcrumed on the latter at their adjacent ends, and sustained by said helical spring means, each of said levers sustaining an end of said leaf spring between its own fulcrum and its connection to said helical spring means.

11. In a truck of the character described, the combination with a side frame having means to hold axle-bearings, a bolster window opening, and spring openings between the window opening and said axle-bearing holding means, a bolster whose end is movable up and down in said window opening, and an equalizing member extending lengthwise of the side frame under the bolster and supporting the bolster at an intermediate point of its own length, of helical spring means mounted on the side frame in said spring openings, levers extending lengthwise of the side frame fulcrumed on its bottom member of the side frame at their adjacent ends, with their remote ends beneath said helical spring means, and hanger means operatively connecting said remote ends of said levers to the upper ends of said helical spring means, to be sustained thereby, each of said levers sustaining an end of said equalizing member between its own fulcrum and its hanger connection to said helical spring means.

WARREN R. ELSEY.